(12) United States Patent
Chen et al.

(10) Patent No.: US 10,289,908 B2
(45) Date of Patent: May 14, 2019

(54) METHOD, APPARATUS, AND COMPUTER PROGRAM PRODUCT FOR TRACKING EYE GAZE AND EYE MOVEMENT

(71) Applicant: Nokia Technologies OY, Espoo (FI)

(72) Inventors: Xin Chen, Evanston, IL (US); Xinyu Huang, Cary, NC (US)

(73) Assignee: NOKIA TECHNOLOGIES OY, Espoo (FI)

( * ) Notice: Subject to any disclaimer, the term of this patent is extended or adjusted under 35 U.S.C. 154(b) by 502 days.

(21) Appl. No.: 14/918,962

(22) Filed: Oct. 21, 2015

(65) Prior Publication Data

US 2017/0116459 A1    Apr. 27, 2017

(51) Int. Cl.
  *G06K 9/00* (2006.01)
  *G06T 5/00* (2006.01)
  *G06T 7/246* (2017.01)

(52) U.S. Cl.
  CPC .......... *G06K 9/00604* (2013.01); *G06T 5/003* (2013.01); *G06T 7/248* (2017.01); *G06K 9/00845* (2013.01); *G06T 2207/10016* (2013.01); *G06T 2207/20012* (2013.01); *G06T 2207/20081* (2013.01); *G06T 2207/30041* (2013.01); *G06T 2207/30201* (2013.01)

(58) Field of Classification Search
  CPC ...... G06K 9/00604; G06T 7/248; G06T 5/003
  See application file for complete search history.

(56) References Cited

U.S. PATENT DOCUMENTS

2004/0003409 A1* 1/2004 Berstis ............... H04N 5/23206
                                                                725/105
2004/0100567 A1* 5/2004 Miller ................ G02B 27/0093
                                                                348/239

OTHER PUBLICATIONS

Zhao, Yajie et al.; "A Performance Comparison Between Circular and Spline-Based Methods for Iris Segmentation"; Pattern Recognition (ICPR); 2014 22nd International Conference on IEEE; 2014.
Nishino, K. and Nayar, S.K.; "Corneal Imaging System: Environment From Eyes"; International Journal on Computer Vision; 70:23-40; 2006.
Alahi, Alexandre et al.; "Freak: Fast Retina Keypoint"; In Computer Vision and Pattern Recognition (CVPR); 2012 IEEE Conference; pp. 510-517; 2012.
Lowe, David G; "Distinctive Image Features From Scale-Invariant Keypoints"; International Journal of Computer Vision; 60(2):91-110, 2004.

* cited by examiner

*Primary Examiner* — Maria E Vazquez Colon
(74) *Attorney, Agent, or Firm* — Alston & Bird LLP

(57) ABSTRACT

Various methods are provided for tracking eye movement and estimating point of regard. Methods may include: providing for capture of a first image of a first eye of a person; providing for capture of a first image of a second eye of the person; and providing for capture of a first image of a field of view of the person. The method may include estimating a first iris and pupil boundary for the first eye using the first image of the first eye; estimating a second iris and pupil boundary for the second eye using the first image of the second eye; determining a first foveated retinal image related to the first eye based on the first image of the first eye and the first iris and pupil boundary of the first eye; and determining a second foveated retinal image related to the second eye based on the first image of the first eye and the second iris and pupil boundary for the second eye.

12 Claims, 7 Drawing Sheets

METHOD, APPARATUS, AND COMPUTER PROGRAM PRODUCT FOR TRACKING EYE GAZE AND EYE MOVEMENT

TECHNOLOGICAL FIELD

Embodiments of the present invention relate generally to a method, apparatus, and computer program product for tracking eye gaze and eye movement, and more specifically, for accurately determining the subject of a person's gaze in their field of view, and classifying eye movements and cognitive states.

BACKGROUND

Tracking eye movement and the object of interest that a person may be viewing is an important feature for many applications in modern computing. Eye movement can be used to determine, for example, if a person is distracted or focused on driving a vehicle, which may be instrumental in crash avoidance systems used in the automotive field. Further, eye tracking and gaze can be used to determine the level of interest of a person in response to advertising, entertainment, or other visual displays. This information may be useful to advertisers, entertainment producers, etc., to determine what attracts the most visual attention from viewers, thereby enabling the advertisers or entertainment producers to develop more focused advertising or entertainment. Various other uses for eye tracking and tracking eye gaze may be used in various fields for a wide variety of purposes. However, improvements to the accuracy of tracking eye gaze and eye movement are desirable to ensure more effective use of eye tracking data.

BRIEF SUMMARY

A method, apparatus and computer program product are therefore provided according to an example embodiment of the present invention for tracking eye gaze and eye movement facilitating biometric recognition, and more specifically, for accurately determining the subject of a person's gaze in their field of view, and classifying eye movements and cognitive states.

In some embodiments, a method may be provided for tracking eye movement and estimating point of regard. Methods may include: providing for capture of a first image of a first eye of a person; providing for capture of a first image of a second eye of the person; and providing for capture of a first image of a field of view of the person. The method may further include estimating a first iris and pupil boundary for the first eye using the first image of the first eye; estimating a second iris and pupil boundary for the second eye using the first image of the second eye; determining a first foveated retinal image related to the first eye based on the first image of the first eye and the first iris and pupil boundary of the first eye; and determining a second foveated retinal image related to the second eye based on the first image of the first eye and the second iris and pupil boundary for the second eye. Methods may include matching the first foveated retinal image and the second foveated retinal image to an image region of the first image of the field of view.

According to some embodiments, determining a first foveated retinal image related to the first eye may include determining a viewpoint locus of the first eye, and determining a second foveated retinal image related to the second eye may include determining a viewpoint locus of the second eye. Matching the first foveated retinal image and the second foveated retinal image to an image region of the first image of the field of view may include calculating the epipolar geometry of the viewpoint locus of the first eye and the viewpoint locus of the second eye. Matching the first foveated retinal image and the second foveated retinal image to an image region of the first image of the field of view may include searching for the most similar image region between each of the first foveated retinal image, the second foveated retinal image, and the first image of the field of view, and selecting the most similar image region as a focal point of the field of view. The first foveated retinal image and the second foveated retinal image may each define a scale-invariant feature transform, and searching for the most similar image region between the first foveated retinal image and the second foveated retinal image may include determining an image region with a highest level of similar feature vectors.

According to some embodiments, methods described herein may further include: providing for capture of a second image of the first eye of the person; providing for capture of a second image of the second eye of the person; and providing for capture of a second image of the field of view of the person. Methods may calculate a difference between the first image of the first eye and the second image of the second eye and calculate a difference between the first image of the second eye and the second image of the second eye. Methods may further calculate a difference between the first image of the field of view and the second image of the field of view, and determine eye movements based on the calculated difference between the respective images. Methods may optionally determine cognitive states based on the eye movements, where the cognitive states may include spontaneous looking, task-relevant looking, orientation of thought looking, and intentional manipulatory looking. The eye movements may include saccades, convergences, shifts, microsaccades or pursuit motions, for example.

Other embodiments of the present invention may provide an apparatus having at least one processor and at least one memory including computer program code. The at least one memory and the computer program code may be configured to, with the processor, cause the apparatus to perform various operations. The apparatus may be caused to: provide for capture of a first image of a first eye of a person; provide for capture of a first image of a second eye of the person; and provide for capture of a first image of a field of view of the person. The apparatus may be caused to: estimate a first iris and pupil boundary for the first eye using the first image of the first eye; estimate a second iris and pupil boundary for the second eye using the first image of the second eye; determine a first foveated retinal image related to the first eye based on the first image of the first eye and the first iris and pupil boundary of the first eye; and determine a second foveated retinal image related to the second eye based on the first image of the first eye and the second iris and pupil boundary for the second eye. The apparatus may be caused to match the first foveated retinal image and the second foveated retinal image to an image region on the first image of the field of view.

According to some embodiments, causing the apparatus to determine a first foveated retinal image related to the first eye may include causing the apparatus to determine a viewpoint locus of the first eye, and causing the apparatus to determine a second foveated retinal image related to the second eye may include causing the apparatus to determine a viewpoint locus of the second eye. Causing the apparatus to match the first foveated retinal image and the second foveated retinal image to an image region of the first image of the field of view may include causing the apparatus to calculate an epipolar geometry of the viewpoint locus of the first eye and the viewpoint locus of the second eye. Causing the apparatus to match the first foveated retinal image and the second foveated retinal image to an image region of the first image may include causing the apparatus to search for the most similar image region between each of the first foveated retinal image, the second foveated retinal image, and the first image of the field of view, and causing the apparatus to select the most similar image region as a focal point of the field of view. The first foveated retinal image and the second foveated retinal image may each define a scale-invariant feature transform, and searching for the most similar image region between the first foveated retinal image and the second foveated retinal image may include determining the image region with the highest level of similar feature vectors.

According to some embodiments, an apparatus as provided herein may: provide for capture of a second image of a first eye of the person; provide for capture of a second image of the second eye of the person; and provide for capture of a second image of the field of view of the person. The apparatus may be caused to: calculate the difference between the first image of the first eye and the second image of the first eye; calculate the difference between the first image of the second eye and the second image of the second eye; calculate differences between the first image of the field of view and the second image of the field of view, and determine eye movements based on the calculated difference between the respective images. The apparatus may be caused to determine cognitive states based on the eye movements, where the cognitive states include: spontaneous looking, task-relevant looking, orientation of thought looking, and intentional manipulatory looking. The eye movements may include saccades, convergences, shifts, microsaccades, and pursuit motion.

Further embodiments of the present invention may provide for a computer program product comprising at least one non-transitory computer-readable storage medium having computer-executable program code instructions stored therein. The computer-executable program code instructions may include program code instructions for providing for capture of a first image of a first eye of a person; providing for capture of a first image of a second eye of the person; and providing for capture of a first image of a field of view of the person. The computer program product may include program code instructions for estimating a first iris and pupil boundary for the first eye using the first image of the first eye; estimating a second iris and pupil boundary for the second eye using the first image of the second eye; determining a first foveated retinal image related to the first eye based on the first image of the first eye and the first iris and pupil boundary for the first eye; determining a second foveated retinal image related to the second eye based on the first image of the second eye and the second iris and pupil boundary for the second eye; and matching the first foveated retinal image and the second foveated retinal image to an image region of the first image of the field of view.

According to some embodiments, the program code instructions for determining a first foveated retinal image related to the first eye includes program code instructions for determining a viewpoint locus of the first eye, wherein the program code instructions for determining a second foveated retinal image related to the second eye includes program code instructions for determining a viewpoint locus of the second eye. The program code instructions for matching the first foveated retinal image and the second foveated retinal image to an image region of the first image of the field of view includes program code instructions for calculating the epipolar geometry of the viewpoint locus of the first eye and the viewpoint locus of the second eye. The program code instructions for matching the first foveated retinal image and the second foveated retinal image to an image region of the first image of the field of view may include program code instructions for searching for the most similar image region between each of the first foveated retinal image, the second foveated retinal image, and the first image of the field of view, and program code instructions for selecting the most similar image region as a focal point of the field of view.

According to some embodiments, the computer program product described herein may further include program code instructions for: providing for capture of a second image of the first eye of the person; providing for capture of a second image of the second eye of the person; and providing for capture of a second image of the field of view of the person. Computer program products may also include program code instructions to calculate the difference between the first image of the first eye and the second image of the second eye and calculate the difference between the first image of the second eye and the second image of the second eye. Computer program products described herein may further include program code instructions to calculate a difference between the first image of the field of view and the second image of the field of view, and determine eye movements based on the calculated difference between the respective images. Computer program products may optionally include program code instructions to determine cognitive states based on the eye movements, where the cognitive states may include spontaneous looking, task-relevant looking, orientation of thought looking, and intentional manipulatory looking. The eye movements may include saccades, convergences, shifts, microsaccades or pursuit motions, for example.

In yet other example embodiments, an apparatus is provided that includes means for tracking eye movement and estimating point of regard. The apparatus may include: means for providing for capture of a first image of a first eye of a person; means for providing for capture of a first image of a second eye of the person; and means for providing for capture of a first image of a field of view of the person. The apparatus may further include means for estimating a first iris and pupil boundary for the first eye using the first image of the first eye; means for estimating a second iris and pupil boundary for the second eye using the first image of the second eye; means for determining a first foveated retinal image related to the first eye based on the first image of the first eye and the first iris and pupil boundary of the first eye; and means for determining a second foveated retinal image related to the second eye based on the first image of the first eye and the second iris and pupil boundary for the second eye. The apparatus may also include means for matching the first foveated retinal image and the second foveated retinal image to an image region of the first image of the field of view.

BRIEF DESCRIPTION OF THE DRAWINGS

Figure 1:
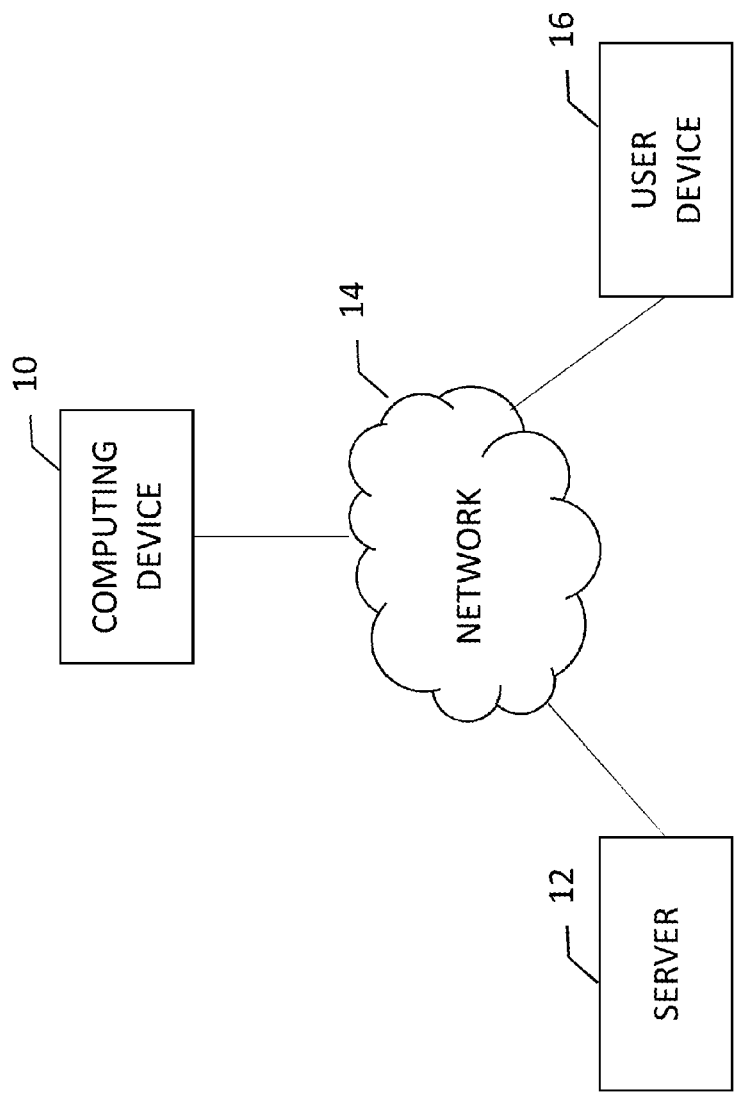
Figure 2:
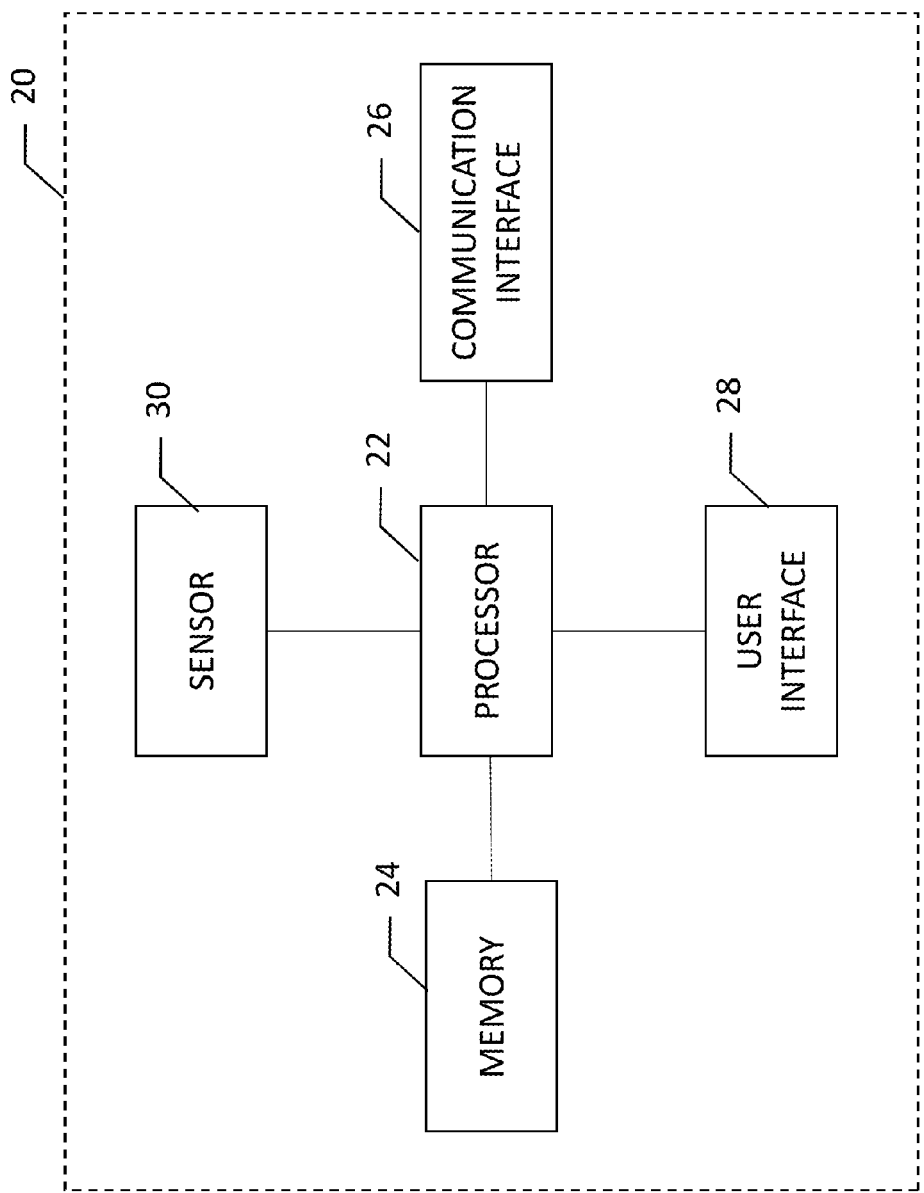
Figure 3:
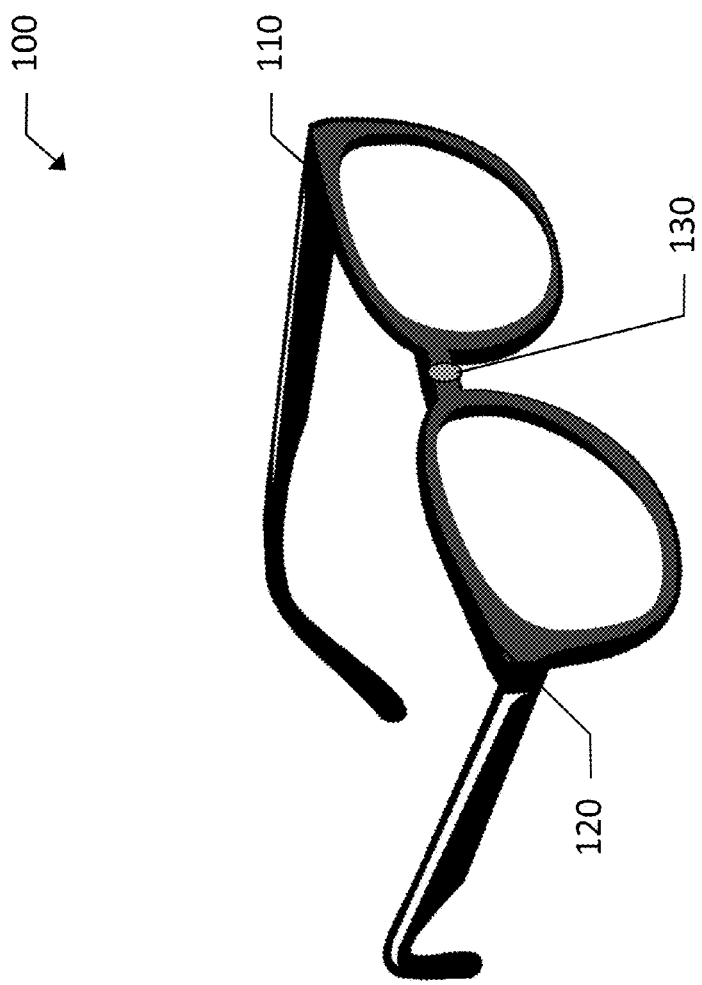
Figure 4:
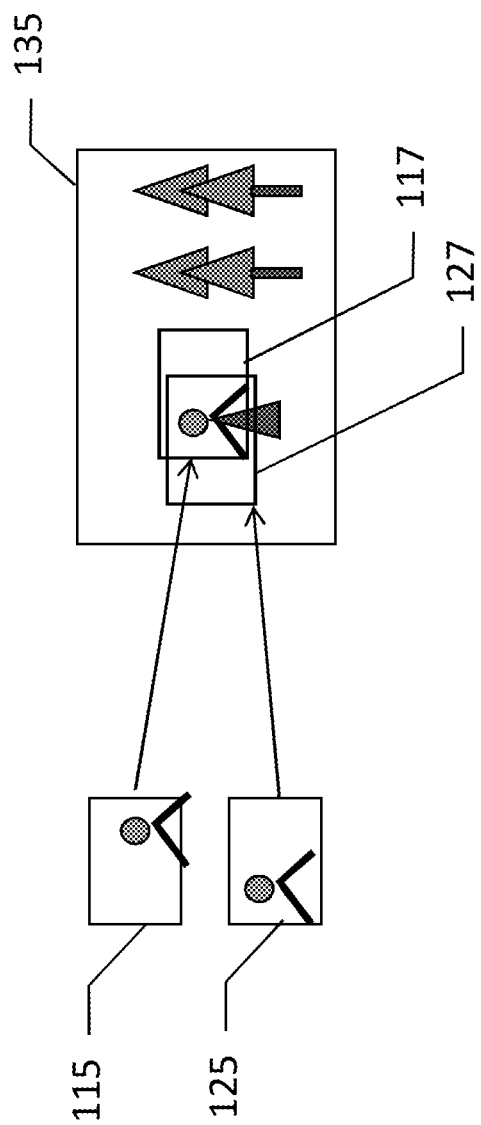
Figure 5:
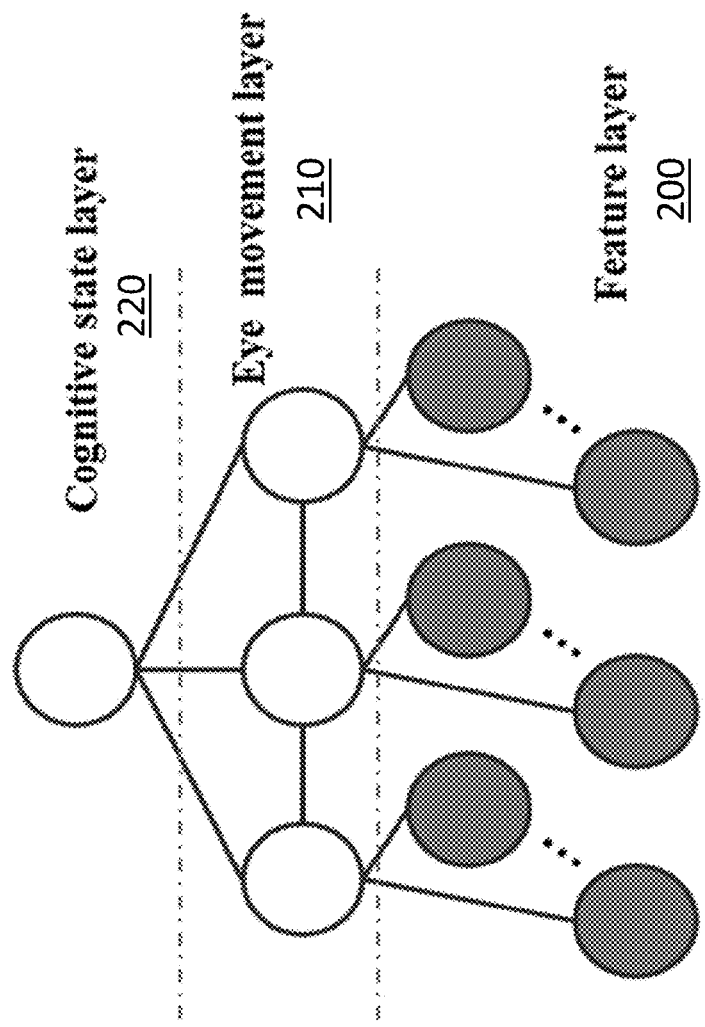
Figure 6:
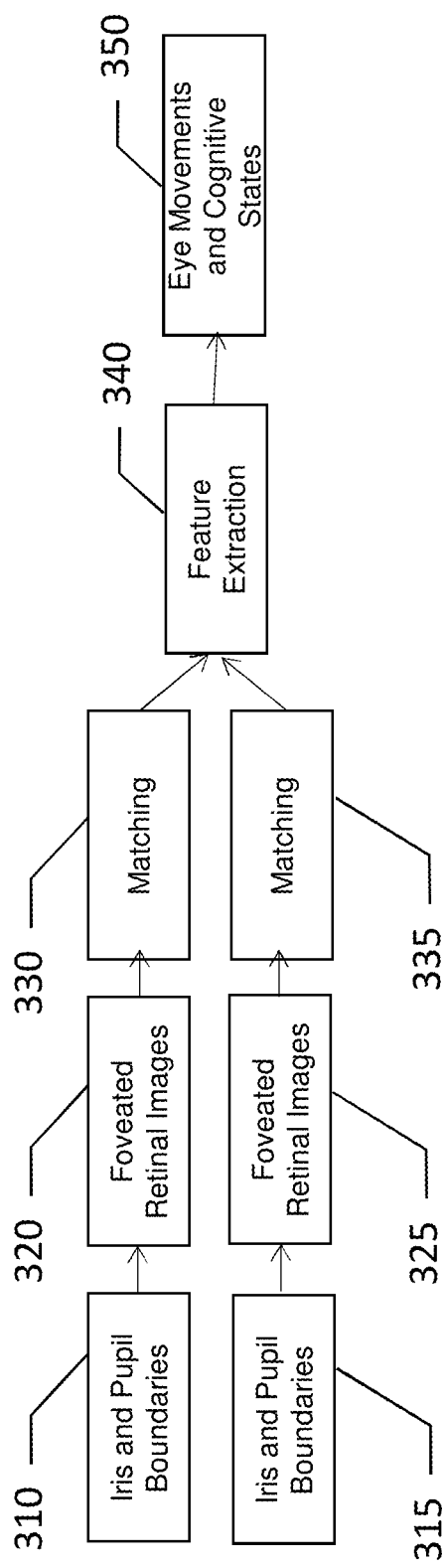
Figure 7:
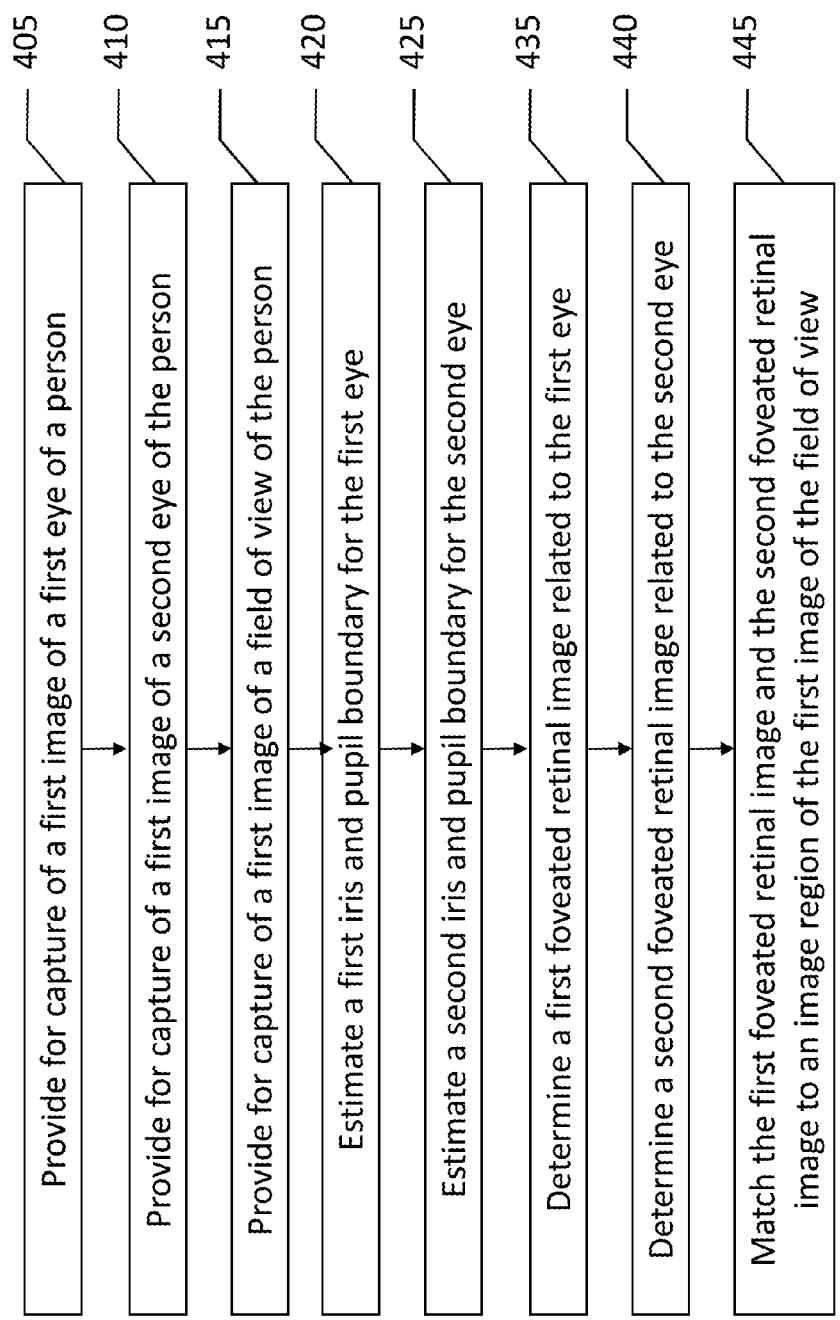

Having thus described some embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is an example apparatus form factor for implementing example embodiments of the present invention;

FIG. 4 is an illustration of matching foveated retinal images with a field of view image according to an example embodiment of the present invention;

FIG. 5 is an illustration of a hierarchical model for classification of eye movements according to an example embodiment of the present invention;

FIG. 6 is a flowchart illustrating a method of operating an example apparatus in accordance with an embodiment of the present invention; and FIG. 7 is another flowchart illustrating a method of operating an example apparatus in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet, or a local area network. However, the computing device and the server may be in communication in other manners, such as via direct communications between the computing device and the server. The user device 16 will be hereinafter described as a mobile terminal, but may be either mobile or fixed in the various embodiments.

The computing device 10 and user device 16 may be embodied by a number of different devices including mobile terminals, such as a personal digital assistant (PDA), mobile telephone, smartphone, laptop computer, tablet computer, or any combination of the aforementioned, and other types of voice and text communications systems. Alternatively, the computing device 10 may be a fixed computer, such as a personal computer, a computer workstation or the like. The server 12 may also be embodied by a computer and, in one embodiment, is embodied by a web server. Additionally, while the system of FIG. 1 depicts a single server, the server may be comprised of a plurality of servers which may collaborate to support browsing activity conducted by the computing device. The computing device 10 of example embodiments may optionally be embodied as a user-worn device, such as a pair of glasses, a hat, or other such device that can benefit from various features of example embodiments of the below-described invention.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26, a user interface 28 and a sensor 30. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

The sensor 30 may also be in communication with the processor 22 to receive information. The sensor may be an image sensor (e.g., a camera), a temperature sensor, an ambient light sensor, a motion sensor, a position sensor, or any type of sensor that detects environmental conditions or a property or context of a device. According to some example embodiments as described herein, the sensor 30 may include a plurality of sensors, such as a plurality of image sensors. As will be described further below, the plurality of sensors may include an image sensor for capturing an image of a first eye, an image sensor for capturing an image of a second eye of the same person, and an image sensor for capturing the field of view of that person. These image sensors may be embodied by a single image sensor or by a plurality of image sensors. The sensor or sensors 30 in collaboration with the processor 22 may provide means for tracking eye movement and estimating point of regard according to various embodiments described herein.

In an example embodiment of the present invention, an apparatus or computer program product may be provided to accurately determine visual attention through the implementation or execution of a method, process, or algorithm that tracks eye gaze and eye movement, and can determine cognitive state, eye movement patterns, and features from a field of view.

Visual attention is the ability to selectively focus on a small region of interest in a complex scene while ignoring other irrelevant regions. Generally, visual attention can be considered a two-stage process: a pre-attentive stage that rapidly scans an entire field of view without capacity limitation, and an attentive, limited-capacity stage that only concentrates on a small area or an object at a time. Visual attention may include various different eye movement patterns such as: saccades, which are rapid and simultaneous movements of both eyes in the same direction; convergence, which are relative movements between two eyes to make a region foveated on both eyes; shift and microsccades, which are much smaller saccades during a fixation period; and, pursuit motion, which is smooth eye movements to track a moving object. These patterns may be further connected to high-level cognitive states, such as spontaneous looking, task-relevant looking, orientation of thought looking, and intentional manipulatory looking.

The fovia centralis of the eye is a region of the retina that provides the highest resolution and clarity in a person's vision. The fovea is responsible for sharp, central vision and generally the focus of a person's visual attention. A foveated region describes the region of an image that is the sharp, central focal point of a person's vision and includes a limited amount of area around the focal point.

Discerning visual attention using image sensors to capture the position of a person's eye can be inaccurate using current methods. For example, when objects are located at different depths in a large environment, it may not be possible to determine the object in the environment or field of view that the person is focusing on or "point of regard" (PoR), particularly in three-dimensional environments with varying degrees of depth. As such, the point of regard may be estimated, which can introduce error. For example, if an accuracy of gaze estimation is 2.5 degrees, at five meters from the eye of the viewer, the accuracy is only within 22 centimeters. Hence, if an object at the point of regard is small, the gaze estimation of the point of regard may miss the object entirely. Further, determining eye gaze direction does not provide sufficient information to infer different eye movements or cognitive states.

FIG. 3 depicts an example embodiment of an apparatus that may be used according to various embodiments of the present invention. The apparatus of FIG. 3 includes a pair of glasses 100 that may include a camera or image capture device for each eye 110, 120. The image capture devices for each eye 110, 120, may be facing the eyes of a wearer of the glasses 100 such that they are not visible in the view of FIG. 4, but are illustrated by the locations of 110, 120. The apparatus may further include a forward-facing image capture device 130 for capturing a field of view of a wearer. The image capture devices 110, 120, 130, may correspond to sensor 30 of apparatus 20 of FIG. 2, and may be in communication with a processor 22. The image capture devices 110 and 120 may provide means for capturing a first image of a first eye of a person and means for capturing a first image of a second eye of the person. Further, image capture device 130 may provide means for capturing an image of a field of view of the person. While the image capture devices of the embodiment of FIG. 3 may be disposed on a pair of glasses, the processor 22 and other ancillary components may be disposed remotely from the glasses 100, such as in a mobile device that is in communication with the glasses, such as via communications interface 26 via a near-field communications system, such as a Bluetooth® system. Optionally, the processor 22 and other components of the apparatus may be disposed within the glasses 100. Further, while the example embodiment of FIG. 3 is illustrated as a pair of glasses, the apparatus may be embodied by various other form factors which permit at least one image capture device to be configured to capture an image of each eye of a user, and at least one image capture device configured to capture an image of a field of view of a user. For example, the apparatus may be embodied by a hat form factor, with image capture devices disposed on or proximate a brim of the hat. Further, some example embodiments may not need to be worn or otherwise attached to a user, such as an example embodiment in which the apparatus is embodied by an environment in which the user is in a substantially stationary position, such as in a vehicle with image capture devices trained on the eyes of the driver.

Referring back to the embodiment of FIG. 3, the inward-facing image capture devices 110, 120, may be cameras with very short focal distances, such as around 15-30 millimeters, so that images captured of a wearer's eyes are in focus. The apertures of the image capture devices 110, 120, may be adjusted such that the reflection of the wearer's eyeballs has a clear contrast, while other regions in the captured image may be saturated. The apertures of the image capture devices 110, 120, may be relatively large such that the apparatus may be used in a dark environment.

According to an example embodiment, the image capture devices 110, 120 may be used to capture images of a first and second eye, respectively. The images captured may be analyzed, such as at processor 22, to determine iris and pupil boundaries. For example, methods may include curve fitting, such as an ellipse or spline, to estimate for each eye image the iris and pupil boundaries. Various methods may be used for estimating the iris and pupil boundaries, such as random sample consensus (RANSAC) spline fitting, interpolation, regression, or the method of least squares, for example. Once the iris and pupil boundaries are calculated, eye gaze, viewpoint locus, field of view, resolution, and epipolar geometry for the eyes may be approximated or derived. Foveated retinal images may then be calculated based on the information derived from the captured images of the first and second eye. According to various embodiments described herein, a processor 22 may provide means for estimating the iris and pupil boundaries using one or more of the aforementioned methods using the first image of the first eye and the first image of the second eye.

Foveated retinal images may be calculated or estimated using eye gaze direction and the image of the field of view of the eye. Based on eye gaze direction or viewpoint locus of the eye, which may be established using the iris and pupil boundaries described above, the point on the image of the field of view may be established through a correlation of the eye gaze direction and the relative position of the environment or field of view. Using the point in the field of view, the image falling on the retina centered at the fovia may be estimated and this may be considered the foveated retinal image. The correlation between the image of the field of view and the eye gaze direction may be made through a known position of the eye relative to the first image capture device 110, and the known relative position of the field of view due to the fixed or known relative position between the first image capture device 110 and the forward-facing image capture device 130. According to some embodiments, a processor, such as processor 22 of FIG. 2, may provide means for determining a first foveated retinal image of a first eye based on the first image of the first eye and the first iris and pupil boundary, while also providing means for determining a second foveated retinal image of a second eye based on the first image of the second eye and the second iris and pupil boundary determined for the second eye.

Foveated retinal images are often not enough for the purpose of accurate eye gaze analysis and can lead to erroneous identification of a point of regard. Moreover, a single foveated retinal image is not enough to determine eye gaze with high accuracy. As such, according to example embodiments described herein, foveated retinal images from both eyes of a person may be used to increase the accuracy and reduce or eliminate erroneous identification of a point of regard. Provided herein is a method of using foveated retinal images from both eyes of a person and matching them against an image of that person's field of view in order to accurately and repeatably identify the point of regard of the person.

According to an example embodiment, the first foveated retinal image from a first eye based on a first image of the first eye, and a second foveated retinal image from a second eye based on a first image of the second eye may be matched with corresponding regions of an image of the field of view of the eyes. The regions of the image of the field of view of the eyes may correspond to the foveated retinal image through a determination that the direction of the gaze for the eye is centered, or estimated to be centered, at the center of the region of the image of the field of view. Matching of image regions between the first foveated retinal image, the second foveated retinal image, and the image of the field of view may be performed, for example through pre-calibration of the image capture devices 110, 120, such that the relative transformation is known and can be applied to the images, such as by processor 22. Another example method for matching of image regions may include searching for the most similar image patch directly in the image of the field of view with the foveated retinal images. The first foveated retinal image and the second foveated retinal image may be matched to an image region in the image of the field of view by searching the image of the field of view and selecting the most similar image region as a focal point of the field of view. The foveated retinal images may be described by feature descriptors, such as a Scale-Invariant Feature Transform (SIFT), Fast Retina Keypoint (FREAK), Speed-up Robust Feature (SURF), or Binary Robust Invariant Scalable Keypoints (BRISK), for example. Then, the closest feature vectors may be aligned between the foveated retinal images and the field of view image to establish the common region that is "matched" between the images.

A Scale-Invariant Feature Transform (SIFT) is an algorithm in computer vision to detect and describe features in images. The SIFT process involves extracting a feature from an image and finding that feature in another image that may have many other features. The foveated retinal images may serve as the training image from which the feature may be extracted, while the field of view image may be the image in which the extracted feature may be sought through SIFT. SIFT relies on extracted features having higher contrast regions, geometric features, and features that remain fixed relative to one another in order to establish the best matching feature in an image.

While regions of the field of view image may be matched to a first foveated retinal image and a second foveated retinal image, using only matching may produce inaccuracies due to the likelihood of repeated shapes, colors, or forms in the field of view. As such, the gaze direction or viewpoint locus of each of the eyes may be used to pinpoint a region of the field of view based on the epipolar geometry of the viewpoint locus of each of the eyes. The epipolar geometry is the geometry based on capturing an image from two distinct positions and correlating what is seen from each of the two distinct positions. Using the two-dimensional foveated retinal images from each of the two eyes that are each focused on the viewpoint locus, which is established to be the same between the two eyes, enables the use of epipolar geometry to draw relationships between the points of the foveated retinal images in a three-dimensional projection. Each foveated retinal image provides constraints between the image points that can be used with constraints between image points from foveated retinal images taken from at least one other, distinct position in order to establish the relationship between image points in a three dimensional space. According to various embodiments, a processor, such as processor 22 of FIG. 2 may provide means for matching the first foveated retinal image and the second foveated retinal image to an image region of the first image of the field of view.

FIG. 4 illustrates an example embodiment of images captured from the image capture devices 110, 120, and 130, of FIG. 3. A first image 115 may be a foveated retinal image from a first image capture device (e.g., 110), while a second image 125 may be a foveated retinal image from a second image capture device (e.g., 120). The field of view image 135 may be captured by a third image capture device (e.g., 130). Through the matching process, which may be any of the aforementioned matching techniques or any other image-matching algorithm, the foveated retinal images 115 and 125 may be matched with regions of the field of view image 135, such as regions 117 and 127, respectively.

The aforementioned process may be performed more than once over a pre-defined period of time to not only accurately determine a point of regard in a field of view, but to also factor in a time dimension to extract features for determining eye movement and cognitive state. For example, features that may be extracted when adding a time dimension (e.g., image capture repeatedly in a prescribed period of time), include: difference between corresponding iris boundaries in consecutive image frames; differences between corresponding iris boundaries of left and right eyes; foveated retinal images; transformation between two foveated retinal images from consecutive frames; and transformation between foveated retinal images from left and right eyes. While some features can be used for correlation and determination of eye movement and cognitive state, other features may be unstable or unreliable and may not be used in eye movement or cognitive state determination.

According to some example embodiments, methods provided herein may determine eye movement over time based on the changes in iris and pupil boundaries determined as described above across a period of time. Saccades could be determined based on fast eye movements, where foveated retinal images can change quickly and the difference between iris boundaries in consecutive image frames may tend to be large. If eye gaze is trained on one small region, foveated retinal images could be very similar over time, and the difference between iris boundaries in consecutive image frames may tend to be small. Many eye movement patterns may be defined and a training or learning process may be used to determine different eye movement patterns based on statistical methods, such as forward selection.

FIG. 5 illustrates a hierarchical model for classification of both eye movements and cognitive states. The feature layer 200 may include the foveated retinal images from left and right eyes, and the field of view images, captured over a period of time. This period of time may be very brief, such as on the order of fractions of a second, or relatively long, such as over a period of seconds or minutes. Based on the feature layer 200, the eye movement layer 210 may be determined. From the eye movement layer 210, the cognitive state may be determined at the cognitive state layer 220.

Cognitive states may include spontaneous looking, task-relevant looking, orientation of thought looking, and intentional manipulatory looking. Each cognitive state may have multiple eye movements in the eye movement layer 210. For example, spontaneous looking may mean that the person has no specific tasks in mind. Thus, spontaneous looking could contain saccades most of the time looking and few short-time convergences when the user is attracted by some interesting regions of the scene in the field of view. Task-relevant looking may occur when the person has a specific task such as searching for a stimulus. The task-relevant looking may include fewer saccades, more convergence, and potentially pursuit motion.

FIGS. 6 and 7 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 6 and 7, when executed, convert a computer or processing circuitry into a particular machine configured to perform an example embodiment of the present invention. Accordingly, the operations of FIGS. 6 and 7 define an algorithm for configuring a computer or processing to perform an example embodiment. In some cases, a general purpose computer may be provided with an instance of the processor which performs the algorithms of FIGS. 6 and 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 is an example flowchart illustrating a method for tracking eye movement and eye gaze in order to establish cognitive states. Iris and pupil boundaries may be established for a left eye 310 and a right eye 315 through images captured through, for example, sensor 30 or image capture devices 110, 120. Foveated retinal images may be determined for the left eye 320 and the right eye 325. The foveated retinal image may be matched to the image of the field of view for the left eye 330 and the right eye 335. Once the matching is complete, feature extraction may begin at 340. At 350, the extracted features may be determined to be eye movements, such as saccades, convergence, pursuit motion, etc. The eye movements may be used to determine cognitive states. The correlation between eye movements and cognitive states may, for example, be stored in a database or a lookup table. The eye movements may provide the input to the lookup table, while the output of the lookup table may be the cognitive state.

FIG. 7 is another flowchart of a process for matching images corresponding to operations 310-335 of FIG. 6. At 405, a first image of a first eye of a person may be captured at 405. The image may be captured, for example, by an image capture device 110 of FIG. 3, or sensor of apparatus 20 of FIG. 2. Similarly, a first image of a second eye of the person may be captured at 410 using the same or a different image capture device. An image of the field of view may also be captured at 415 by an image capture device that is facing away from the eyes of the person, toward the environment that the person is viewing. A first iris and pupil boundary may be estimated for the first eye at 420, and a second iris and pupil boundary may be estimated for the second eye at 425. This estimation may be performed through curve or spline fitting techniques as described above. A first foveated retinal image may be determined at 435 and a second foveated retinal image may be determined at 440, where the foveated retinal images may be determined based at least in part on the estimated iris and pupil boundaries of the respective eyes. The first foveated retinal image and the second foveated retinal image may be matched to the first image of the field of view at 445 through any of the various matching techniques described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   providing for capture of a first image of a first eye of a person;
   providing for capture of a first image of a second eye of the person;
   providing for capture of a first image of a field of view of the person;
   estimating a first iris and pupil boundary for the first eye using the first image of the first eye;
   estimating a second iris and pupil boundary for the second eye using the first image of the second eye;
   determining a first foveated retinal image related to the first eye based on the first image of the first eye and the first iris and pupil boundary for the first eye;
   determining a second foveated retinal image related to the second eye based on the first image of the second eye and the second iris and pupil boundary for the second eye;
   matching the first foveated retinal image and the second foveated retinal image to an image region of the first image of the field of view, wherein matching the first foveated retinal image and the second foveated retinal image to the image region of the first image of the field of view comprises calculating an epipolar geometry of a viewpoint locus of the first eye and a viewpoint locus of the second eye; and
identifying a focal point of the field of view of the person based on the matching.

2. The method of claim 1, wherein determining the first foveated retinal image related to the first eye comprises determining the viewpoint locus of the first eye, and wherein determining the second foveated retinal image related to the second eye comprises determining the viewpoint locus of the second eye.

3. The method of claim 1, further comprising:
providing for capture of a second image of the first eye of the person;
providing for capture of a second image of the second eye of the person;
providing for capture of a second image of the field of view of the person;
calculating differences between the first image of the first eye and the second image of the first eye;
calculating differences between the first image of the second eye and the second image of the second eye;
calculating differences between the first image of the field of view and the second image of the field of view; and
determining eye movements based on the calculated differences between the respective images.

4. The method of claim 3, further comprising determining cognitive states based on the eye movements, wherein the cognitive states comprise: spontaneous looking, task-relevant looking, orientation of thought looking, or intentional manipulatory looking.

5. The method of claim 4, wherein the eye movements comprise saccades, convergences, shifts, microsaccades, or pursuit motion.

6. An apparatus comprising at least one processor and at least one memory including computer program code, the at least one memory and the computer program code configured to, with the processor, cause the apparatus to at least:
provide for capture of a first image of a first eye of a person;
provide for capture of a first image of a second eye of the person;
provide for capture of a first image of a field of view of the person;
estimate a first iris and pupil boundary for the first eye using the first image of the first eye;
estimate a second iris and pupil boundary for the second eye using the first image of the second eye;
determine a first foveated retinal image related to the first eye based on the first image of the first eye and the first iris and pupil boundary for the first eye;
determine a second foveated retinal image related to the second eye based on the first image of the second eye and the second iris and pupil boundary for the second eye;
match the first foveated retinal image and the second foveated retinal image to an image region of the first image of the field of view, wherein matching the first foveated retinal image and the second foveated retinal image to the image region of the first image of the field of view comprises calculating an epipolar geometry of a viewpoint locus of the first eye and a viewpoint locus of the second eye; and
identify a focal point of the field of view of the person based on the matching.

7. The apparatus of claim 6, wherein causing the apparatus to determine the first foveated retinal image related to the first eye comprises causing the apparatus to determine the viewpoint locus of the first eye, and wherein causing the apparatus to determine the second foveated retinal image related to the second eye comprises causing the apparatus to determine the viewpoint locus of the second eye.

8. The apparatus of claim 6, wherein the apparatus is further caused to:
provide for capture of a second image of a the first eye of the person;
provide for capture of a second image of a the second eye of the person;
provide for capture of a second image of the field of view of the person;
calculate differences between the first image of the first eye and the second image of the first eye;
calculate differences between the first image of the second eye and the second image of the second eye;
calculate differences between the first image of the field of view and the second image of the field of view; and
determine eye movements based on the calculated differences between the respective images.

9. The apparatus of claim 8, further comprising causing the apparatus to determine cognitive states based on the eye movements, wherein the cognitive states comprise: spontaneous looking, task-relevant looking, orientation of thought looking, or intentional manipulatory looking.

10. The apparatus of claim 8, wherein the eye movements comprise saccades, convergences, shifts, microsaccades, or pursuit motion.

11. A computer program product comprising at least one non-transitory computer-readable storage medium having computer-executable program code instructions stored therein, the computer-executable program code instructions comprising program code instructions for:
providing for capture of a first image of a first eye of a person;
providing for capture of a first image of a second eye of the person;
providing for capture of a first image of a field of view of the person;
estimating a first iris and pupil boundary for the first eye using the first image of the first eye;
estimating a second iris and pupil boundary for the second eye using the first image of the second eye;
determining a first foveated retinal image related to the first eye based on the first image of the first eye and the first iris and pupil boundary for the first eye;
determining a second foveated retinal image related to the second eye based on the first image of the second eye and the second iris and pupil boundary for the second eye;
matching the first foveated retinal image and the second foveated retinal image to an image region of the first image of the field of view, wherein matching the first foveated retinal image and the second foveated retinal image to the image region of the first image of the field of view comprises calculating an epipolar geometry of a viewpoint locus of the first eye and a viewpoint locus of the second eye; and
identifying a focal point of the field of view of the person based on the matching.

12. The computer program product of claim 11, wherein the program code instructions for determining the first foveated retinal image related to the first eye comprise program code instructions for determining the viewpoint locus of the first eye, and wherein the program code instructions for determining the second foveated retinal image related to the second eye comprise program code instructions for determining the viewpoint locus of the second eye.

\* \* \* \* \*

UNITED STATES PATENT AND TRADEMARK OFFICE
CERTIFICATE OF CORRECTION

PATENT NO. : 10,289,908 B2  
APPLICATION NO. : 14/918962  
DATED : May 14, 2019  
INVENTOR(S) : Chen et al.

Page 1 of 1

It is certified that error appears in the above-identified patent and that said Letters Patent is hereby corrected as shown below:

In the Claims

<u>Column 16</u>  
Line 10, delete "a"  
Line 12, delete "a"

Signed and Sealed this  
Third Day of December, 2019

Andrei Iancu  
*Director of the United States Patent and Trademark Office*